(12) United States Patent
Messing et al.

(10) Patent No.: US 12,729,713 B2
(45) Date of Patent: Sep. 8, 2026

(54) STEERING SHAFT ASSEMBLY

(71) Applicant: Steering Solutions IP Holding Corporation, Saginaw, MI (US)

(72) Inventors: Matthew L. Messing, Saginaw, MI (US); Douglas M. Schneider, Frankenmuth, MI (US); Steven R. Burk, Frankenmuth, MI (US); Robert J. Smith, Midland, MI (US); Phillip D. Beckman, Jr., Owosso, MI (US); Bruce D. Kniebbe, Birch Run, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 266 days.

(21) Appl. No.: 18/521,496

(22) Filed: Nov. 28, 2023

(65) Prior Publication Data

US 2024/0175462 A1 May 30, 2024

Related U.S. Application Data

(63) Continuation-in-part of application No. 18/324,505, filed on May 26, 2023.

(Continued)

(51) Int. Cl.
*F16C 1/04* (2006.01)
*F16C 3/02* (2006.01)

(52) U.S. Cl.
CPC ............ *F16C 3/02* (2013.01); *F16C 2326/06* (2013.01)

(58) Field of Classification Search
CPC ........ F16D 1/04; F16D 1/0888; F16D 1/0876; F16D 1/0894; Y10T 403/7035

(Continued)

(56) References Cited

U.S. PATENT DOCUMENTS 2,437,305 A * 3/1948 Nickle .................. F16B 35/005 411/301
4,287,972 A * 9/1981 Petrak .................. F16D 43/206 192/54.2

(Continued)

FOREIGN PATENT DOCUMENTS

| | | | |
|---|---|---|---|
| DE | 4129042 | A1 | 3/1993 |
| JP | H0624300 | Y2 | 6/1994 |
| JP | 2019206217 | A | 12/2019 |

OTHER PUBLICATIONS

English translation of Examination Report regarding related DE App. No. 10 2023 133 449.2; issued Oct. 15, 2025.

*Primary Examiner* — Daniel J Wiley
(74) *Attorney, Agent, or Firm* — Dickinson Wright PLLC

(57) ABSTRACT

A steering shaft assembly includes a shaft having a first end region including a nose, a male spline region coupleable with a female spline region of a clamp yoke, a ring flag seat adjacent said nose, and a first ring flag locating feature between said ring flag seat and said male spline region. The steering shaft assembly also includes a ring flag having an annular band seated on said ring flag seat, a flag extending axially from said annular band in a first direction beyond said first end and radially outwardly from said annular band, and a second ring flag locating feature extending axially from said annular band in a second direction opposite said first direction, said second ring flag locating feature interacting with said first ring flag locating feature to orient said ring flag in a predetermined rotational orientation relative to said shaft.

8 Claims, 11 Drawing Sheets

Related U.S. Application Data

(60) Provisional application No. 63/438,586, filed on Jan. 12, 2023, provisional application No. 63/428,776, filed on Nov. 30, 2022.

(58) Field of Classification Search
USPC .............................................. 403/355–359.6
See application file for complete search history.

(56) References Cited

U.S. PATENT DOCUMENTS 4,475,737 A * 10/1984 Cook, Jr. ................ F16D 3/387 464/17
4,696,382 A * 9/1987 Aho ................... B60K 17/3515 192/69.43
5,807,180 A * 9/1998 Knodle ................. F16D 1/0882 464/144
6,222,292 B1 * 4/2001 Smith ..................... F16D 1/112 310/91
6,382,624 B1 * 5/2002 Kelm .................... B41F 13/008 464/182
6,390,925 B1 * 5/2002 Perrow ................. F16D 3/2055 464/111
6,739,540 B2 * 5/2004 Shiotani .................. B60R 22/46 74/451
8,092,312 B2 * 1/2012 Duncan ................... F16D 3/387 464/134
2001/0002966 A1 * 6/2001 Aota ......................... F16C 3/03 403/359.5
2010/0119301 A1 * 5/2010 Langer .................... F16D 1/116 403/359.5
2012/0027508 A1 * 2/2012 Juh ....................... F16D 1/0876 29/428
2014/0178127 A1 * 6/2014 Mottier ................. F16D 1/0864 403/373
2024/0174284 A1 * 5/2024 Partyka .................... B62D 1/16
2024/0175462 A1 * 5/2024 Messing .................. B62D 1/20

* cited by examiner

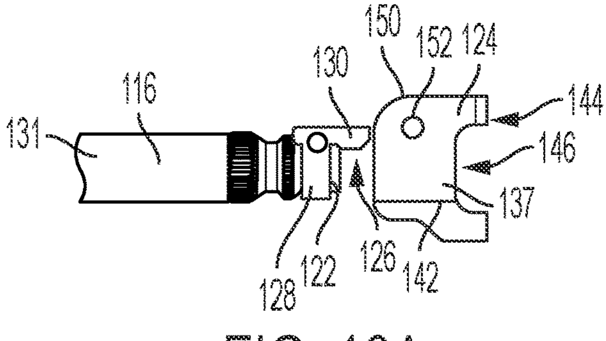
FIG. 10A
126
124
116
144
131
146
137
128
FIG. 10B
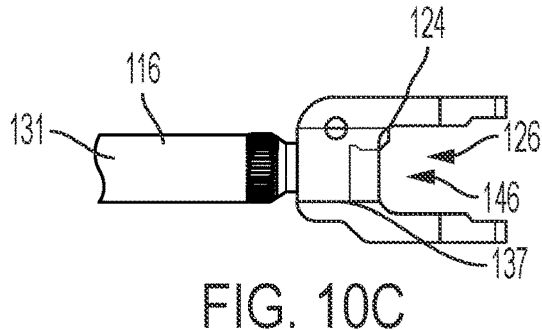
FIG. 10C
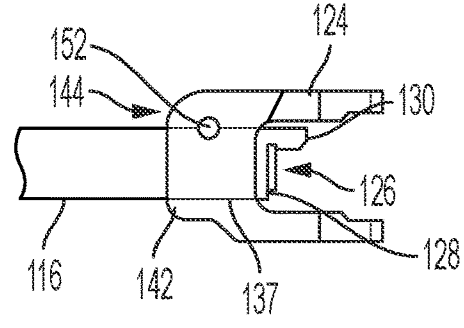
FIG. 10D

STEERING SHAFT ASSEMBLY

CROSS-REFERENCE TO RELATED APPLICATION

This application claims priority to U.S. Provisional Patent Application Ser. No. 63/428,776, filed Nov. 30, 2022, and is a continuation-in-part application of U.S. patent application Ser. No. 18/324,505, filed May 26, 2023, which claims priority to U.S. Provisional Patent Application Ser. No. 63/438,586, filed Jan. 12, 2023, the disclosures of each are incorporated by reference herein in their entireties.

FIELD OF THE INVENTION

The embodiments disclosed herein relate to vehicle steering systems and, more particularly, a steering shaft assembly and methods associated with assembly thereof.

BACKGROUND

Steering systems include a steering shaft assembly which connects a steering input device (e.g., steering wheel) to some type of output component or assembly to carry out steering maneuvers for a vehicle. An intermediate steering shaft is often part of a steering shaft assembly. The intermediate steering shaft may be difficult for OEM's to assemble in the vehicle correctly due various factors, including tight environment, assembly from below the vehicle, low lighting, a need to walk with the vehicle during assembly, limited cycle time. With these complications, special considerations must be taken to ensure the connections of the intermediate steering shaft with bolts can only be made in the correct position so that a "false assembly" does not erroneously occur.

One solution involves a ring with a flag that is oriented with, and snapped on to, the shaft connection that blocks the bolt from passing through the yoke hole while the shaft is partially engaged inside the yoke. During assembly, the ring flag must be expanded over a lead-in and retaining shoulder and after it is pressed to position the ring will snap into the groove. The ring flag has no geometrical alignment with the shaft until after pressing the ring a specified distance. Therefore, the assembly process requires an assembly tool to properly align the ring flag to the shaft serrations which poses a risk to damaging the shaft serrations. The receiving alignment geometry on the shaft cannot be formed and must be machined which results in higher cost.

SUMMARY

According to one aspect of the disclosure, a steering shaft assembly includes a shaft having an end region to be coupled to another component with a mechanical fastener, the shaft comprising a protrusion extending radially outwardly from the shaft within the end region of the shaft. The steering shaft assembly also includes a ring flag coupleable to the end region of the shaft, the ring flag comprising a recess positioned to receive the protrusion of the shaft at a desired relative axial position of the ring flag and the shaft to rotationally align the ring flag and the shaft at a desired rotational position.

According to another aspect of the disclosure, a method of assembling a steering shaft assembly is provided. The method includes aligning a protrusion extending radially outward from an end portion of a shaft with a recess defined by an inner wall of a ring flag. The method also includes inserting a shaft through an aperture defined by a ring flag with the protrusion disposed within the recess to provide a desired rotational position of the ring flag relative to the shaft. The method further includes axially moving the shaft to a desired axial position relative to the ring flag.

According to another aspect of the disclosure, a steering shaft assembly includes a shaft having a first end region including a nose, a male spline region coupleable with a female spline region of a clamp yoke, a ring flag seat adjacent said nose, and a first ring flag locating feature between said ring flag seat and said male spline region. The steering shaft assembly also includes a ring flag having an annular band seated on said ring flag seat, a flag extending axially from said annular band in a first direction beyond said first end and radially outwardly from said annular band, and a second ring flag locating feature extending axially from said annular band in a second direction opposite said first direction, said second ring flag locating feature interacting with said first ring flag locating feature to orient said ring flag in a predetermined rotational orientation relative to said shaft.

According to another aspect of the disclosure, a steering shaft and clamp yoke assembly includes a clamp yoke having an annular wall with a through split and a through bore having a female spline region, said annular wall having through openings configured for receipt of a clamp fastener therethrough. The assembly also includes a shaft having a first end region including a nose, a male spline region coupleable with said female spline region of said clamp yoke, a ring flag seat adjacent said nose, and a first ring flag locating feature between said ring flag seat and said male spline region. The assembly further includes a ring flag having an annular band seated on said ring flag seat, a flag extending axially from said annular band in a first direction beyond said first end and radially outwardly from said annular band, and a second ring flag locating feature extending axially from said annular band in a second direction opposite said first direction, said second ring flag locating feature interacting with said first ring flag locating feature to orient said ring flag in a predetermined rotational orientation relative to said shaft.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 10A-10D illustrates a series of positions during an assembly process for an intermediate shaft and a clamp yoke to form the joint region:

DETAILED DESCRIPTION

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
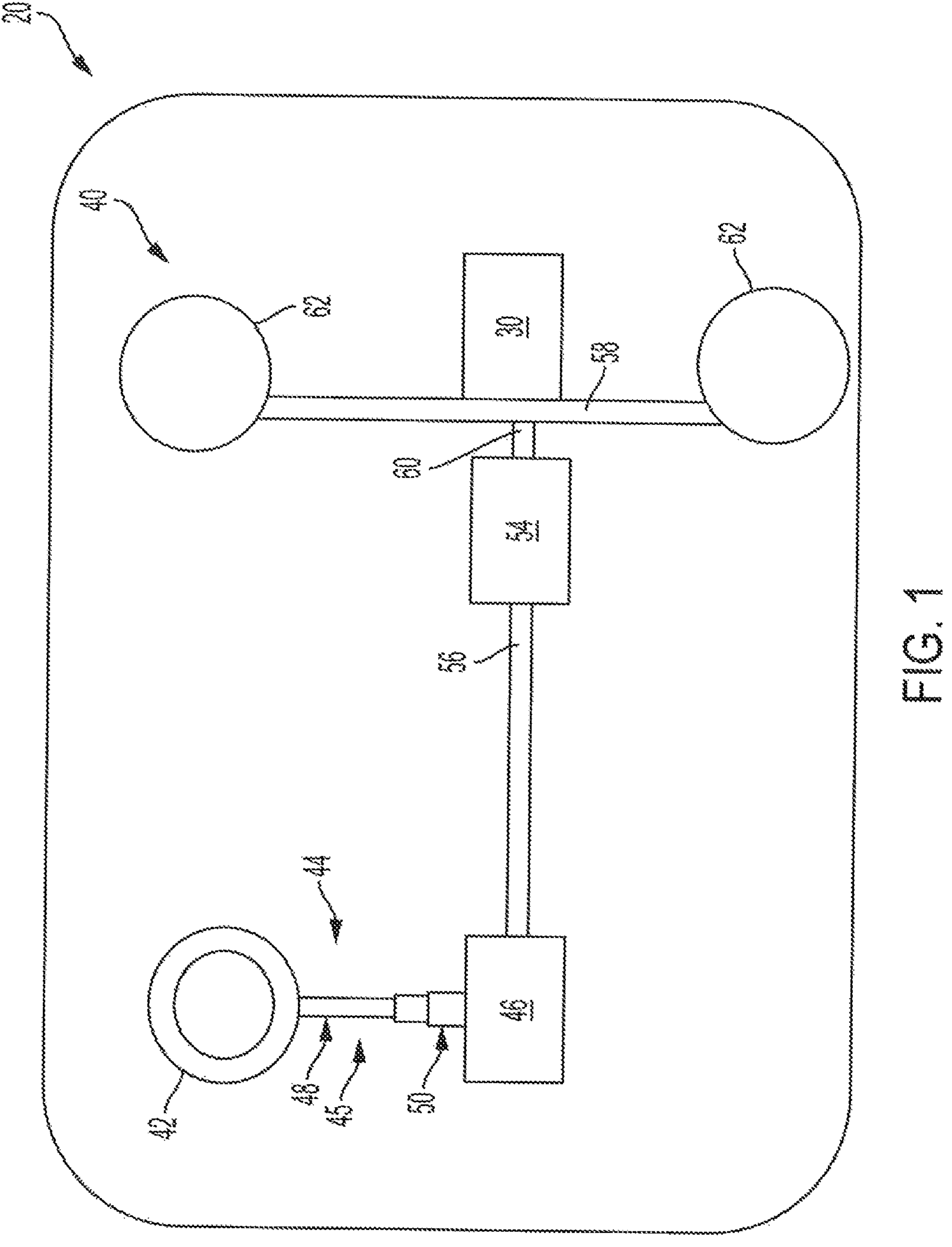
FIG. 1 is a schematic illustration of a vehicle steering system.

Referring initially to FIG. 1, a vehicle 20 is generally illustrated according to the principles of the present disclosure. The vehicle 20 may include any suitable vehicle, such as a car, a truck, a sport utility vehicle, a mini-van, a crossover, any other passenger vehicle, any suitable commercial vehicle, or any other suitable vehicle. While the vehicle 20 may be a passenger vehicle having wheels and for use on roads, the principles of the present disclosure may apply to other vehicles, such as planes, tractors, boats, or other vehicles. The vehicle 20 may include a propulsion system 30, such as an ignition system, an electronic system, or combinations thereof.

The vehicle 20 further includes a steering system 40. The steering system 40 may be configured as a driver interface steering system, an autonomous driving system, or a system that allows for both driver interface and autonomous steering. The steering system 40 may include an input device 42, such as a steering wheel, wherein a driver may mechanically provide a steering input by turning the steering wheel. A steering column assembly 44 includes a steering column 45 that extends along an axis from the input device 42 to an output assembly 46. The output assembly 46 may include a pinion shaft assembly, an I-shaft, a cardan joint, steer-by-wire components or any feature conventionally located opposite the input device 42.

The steering column 45 may include at least two axially adjustable portions, for example, an upper jacket 48 and a lower jacket 50 that are axially adjustable with respect to one another. The at least two axially adjustable portions may further include one or more third portions 49 disposed between the upper jacket 48 and the lower jacket 50 in some embodiments. It is to be appreciated that other structural features of the steering column 45 may be part of the upper jacket 48 and the lower jacket 50, such as brackets, rails, other devices, or combinations thereof.

The steering column 45 is moveable over a range of positions from a fully extended position to a fully retracted position. In the fully extended position, the upper jacket 48 and the lower jacket 50 are moved axially so that the input device 42 is located near an operator of the vehicle. In the retracted position, the upper jacket 48 and the lower jacket 50 are moved axially so that the input device 42 is located further away from an operator of the vehicle, when compared to the extended position. In some embodiments, the retracted position may correspond to stowing the input device 42. For example, it may be beneficial to place the input device 42 in a stowed location during autonomous driving. In operation, the axial movement of the upper jacket 48 and the lower jacket 50 may be effectuated by manual movement by an operator or electromechanically by a telescope actuator. This axial movement adjusts between the extended position, the retracted position, and any intermediary positions.

A steering gear assembly 54, the output assembly 46 and the steering input device 42 may be connected via a steering shaft assembly 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear and/or various traditional components. The output shaft 60 is operably connected to the steering gear assembly 54 such that a rotation of the steering shaft assembly 56 causes a responsive movement of the output shaft 60 and causes the drive axle to turn wheels 62. It is to be appreciated that the steering components described herein may be part of a steer-by-wire system or one which includes a direct mechanical linkage over the span of the components.

Figure 2:
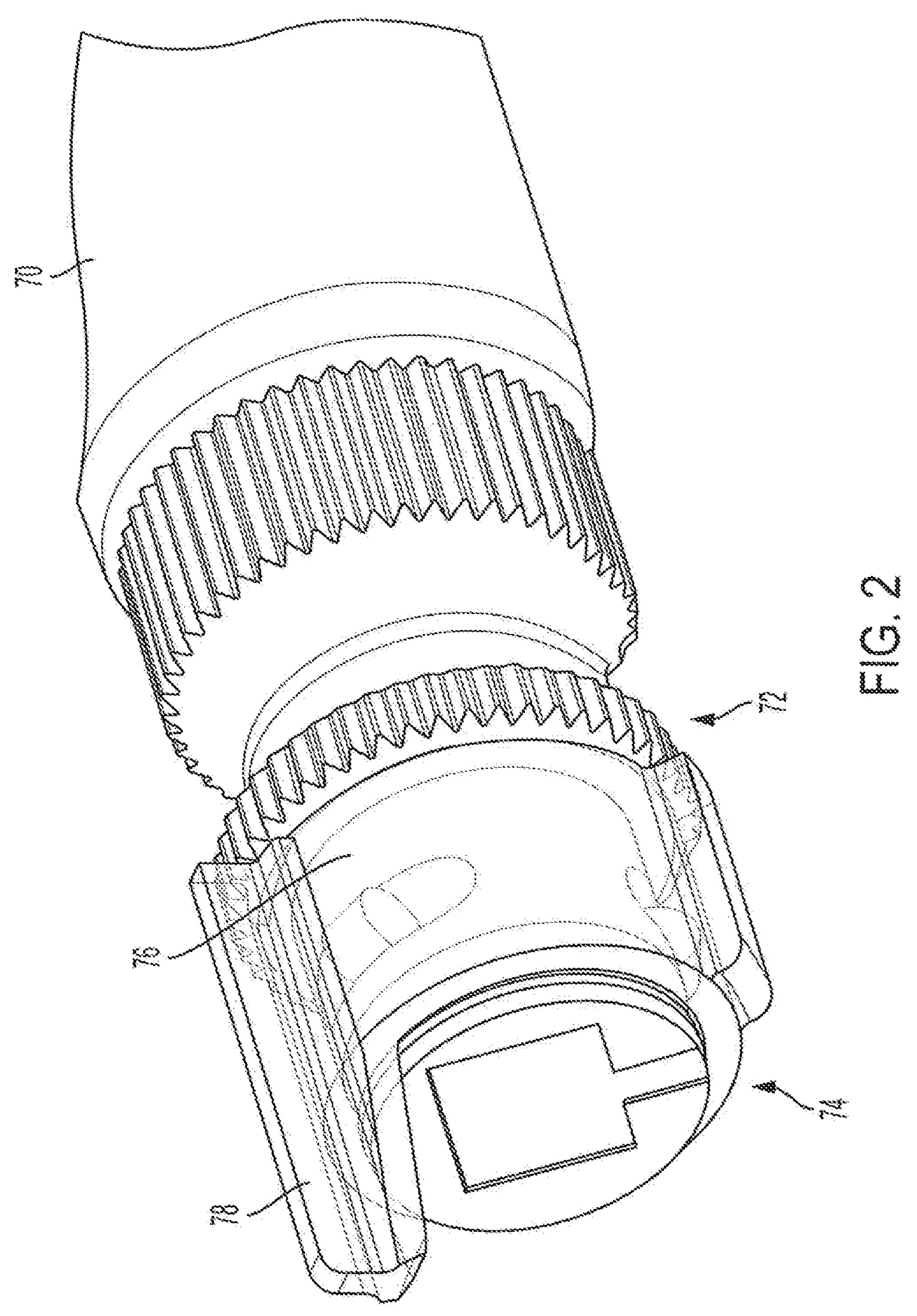
FIG. 2 is a perspective view of a portion of a joint region of a steering shaft assembly of the vehicle steering system.

Referring to FIG. 2, a portion of a steering shaft assembly 56 is shown, specifically an end portion of an intermediate shaft 70 which is coupleable to a connecting component, such as a yoke (not shown). The intermediate shaft 70 extends along a steering column axis. The illustrated portion of the intermediate shaft 70 may be referred to as a joint region 72 where the intermediate shaft 70 is coupled to the connecting component (e.g., yoke). Also illustrated is a ring flag 74 which serves as an error-proofing device that facilitates coupling of the intermediate shaft 70 with the other connecting component.

The other structural member (e.g., yoke) defines a hole for a pin or bolt to be inserted for coupling to the intermediate shaft 70. It is desirable to couple the intermediate shaft 70 and the other structural member at a specific axial position. The embodiments described herein facilitate precise and reliable coupling at such a desired position. The ring flag 74 includes a ring portion 76 and a flag portion 78. The ring portion 76 is a substantially cylindrical member sized to accommodate receiving the end portion of the intermediate shaft 70 therein. The flag portion 78 is longer axially compared to the ring portion 76. The flag portion 78 blocks insertion of the pin, bolt of the like until the connecting member is axially moved to an extent where the flag portion 78 no longer blocks insertion of the pin or bolt.

Figures 3, 4:
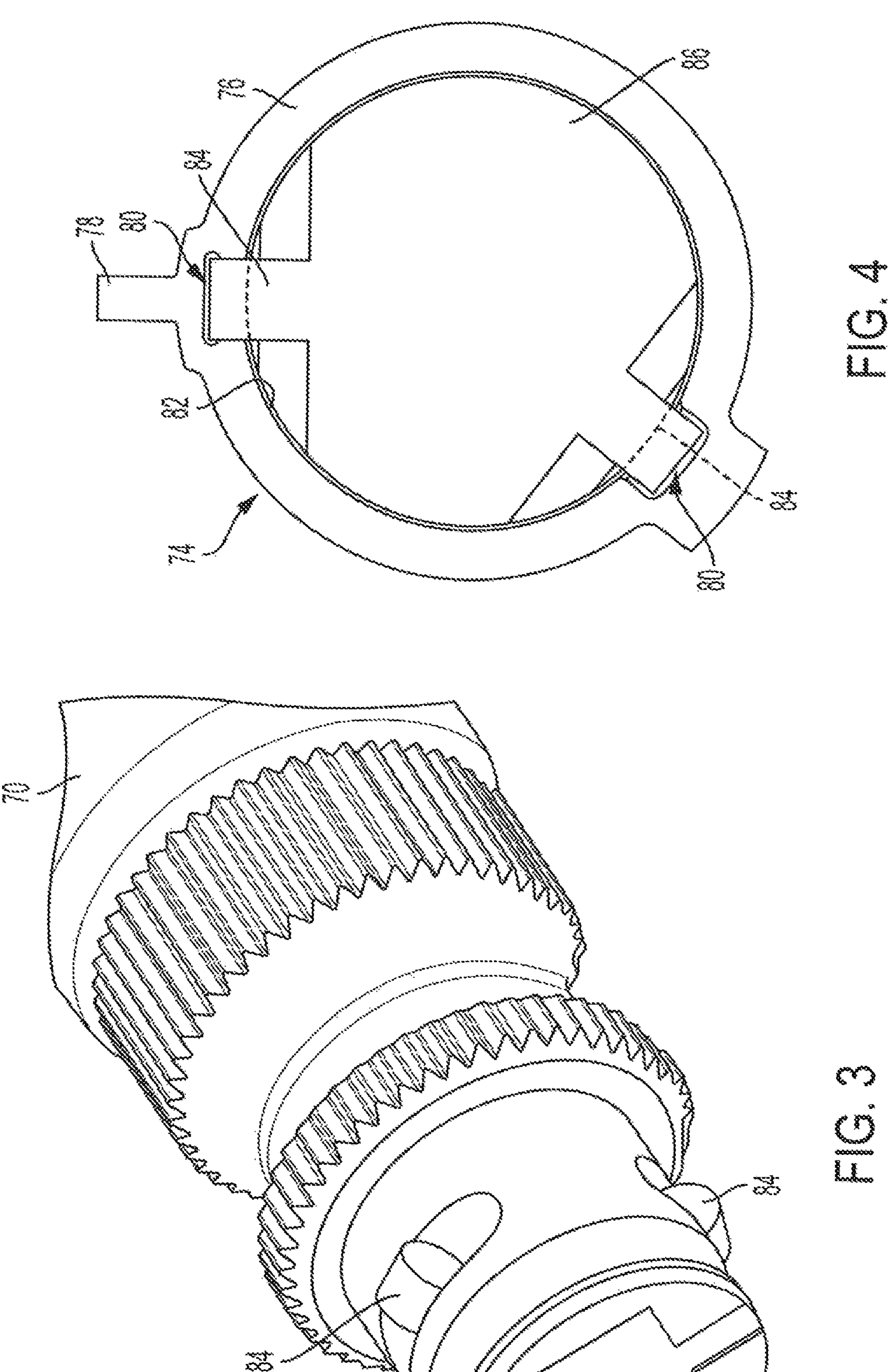
FIG. 3 is a perspective view of a shaft of the steering shaft assembly.
FIG. 4 is a cross-sectional view of the joint region.

Referring now to FIGS. 3 and 4, the ring flag 74 includes one or more female geometrical features 80 defined by an inner wall 82 of the ring portion 76 and one or more male geometrical features 84 protruding from the outer diameter 86 of a portion of the intermediate shaft 70. The male geometrical feature(s) 84 on the intermediate shaft 70 are pinch tabs in the illustrated embodiment, but alternative protruding features are contemplated. The female geometrical feature(s) 80 defined by the ring flag 74 are receiving notches in the illustrated embodiment, but alternative geometries are contemplated. Regardless of the specific geometry and dimensions of the female and male geometrical features

80, 84, alignment geometry features may be formed instead of machined on the intermediate shaft 70, thereby reducing cost.

The geometric features 80, 82 allow assembly of ring flag alignment geometric features 80 to engage the features 82 of the intermediate shaft 70 before a press process is required to overcome a lead-in taper 88 of the end portion of the intermediate shaft 70, thereby eliminating need for a special assembly tool to orient the ring flag 74 properly with the intermediate shaft 70. In other words, the ring flag 74 is rotationally positioned in a desired alignment relative to the intermediate shaft 70 prior to the press process for final axial installation (see assembly stages in FIGS. 5-7).

Figure 9:
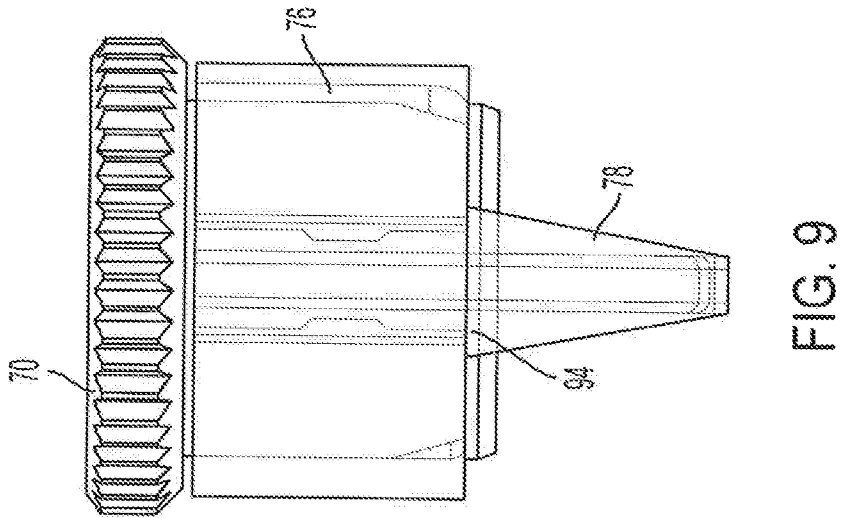
FIG. 9 is a top plan view of the joint region.

The lead-in diameter of the intermediate shaft 70 is substantially equal to the inner diameter of the ring portion 76 of the ring flag 74 to ensure proper orientation of the male features 82 of the intermediate shaft 70 within the female features 80 of the ring flag 74. A retention shoulder 90 (FIGS. 5-7) on the intermediate shaft 70 is submerged below the ring flag installation area diameter and a retention lip 92 is present on the inner diameter of the ring portion 76 of the ring flag 74, which snaps into the groove. The cross-section of ring flag 74 extension that protrudes off the end of the intermediate shaft 70 is reduced by moving the alignment geometry features 80, 82, so gussets 94 along the ring diameter are present for strength, as shown in FIGS. 8 and 9.

Figure 5:
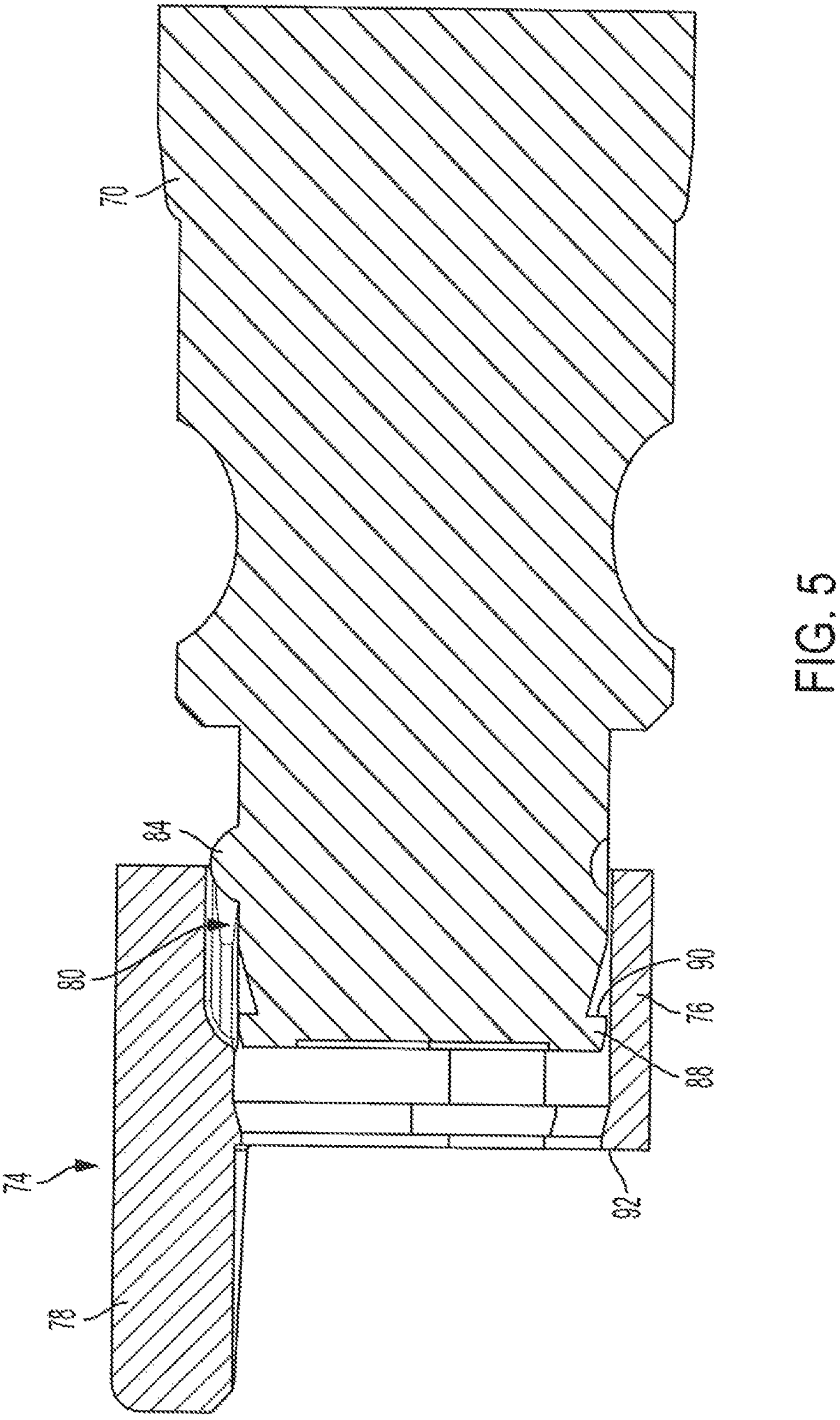
FIG. 5 is a cross-sectional view of a ring flag and the shaft in a first assembly position.
Figure 6:
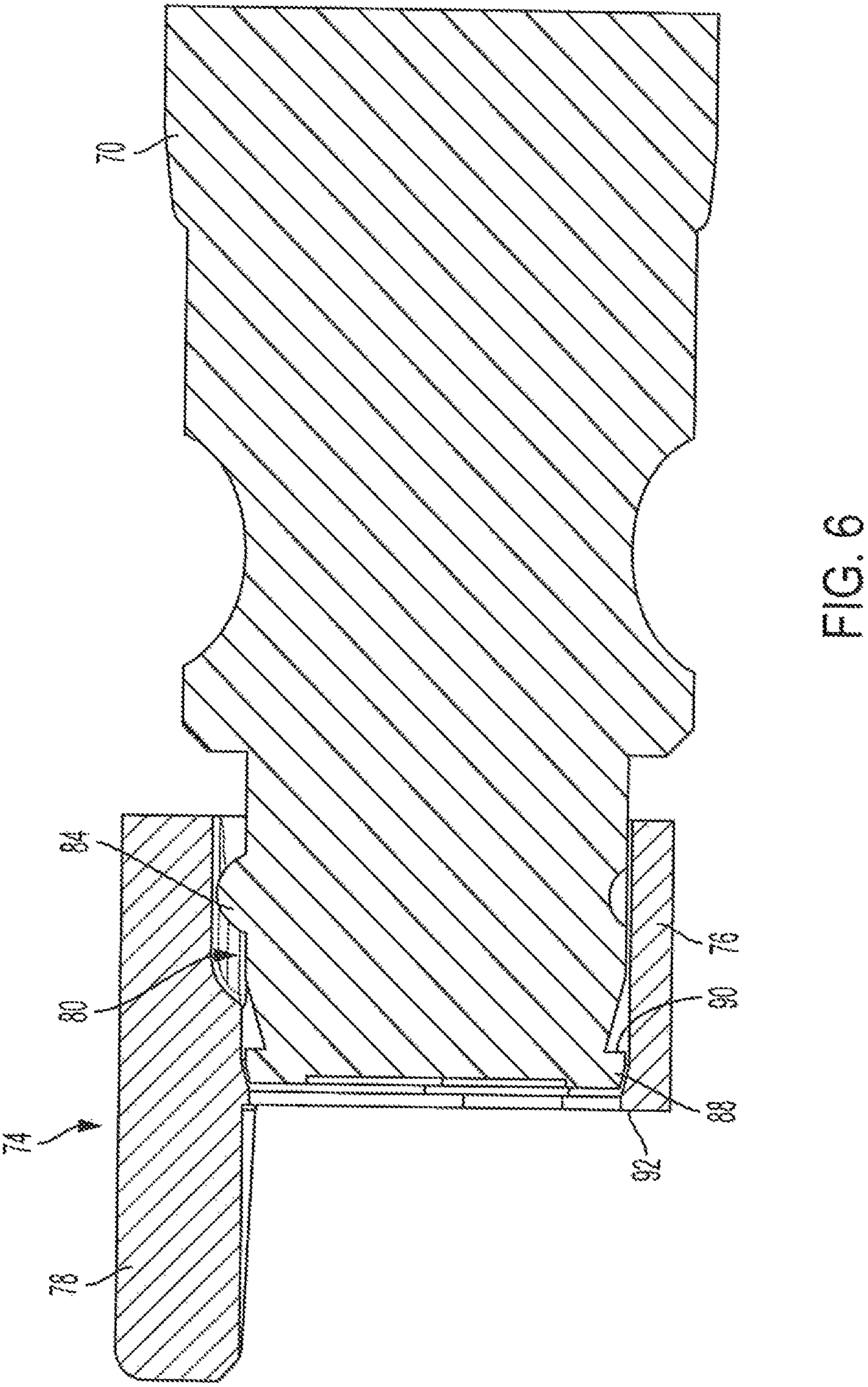
FIG. 6 is a cross-sectional view of the ring flag and the shaft in a second assembly position.
Figure 7:
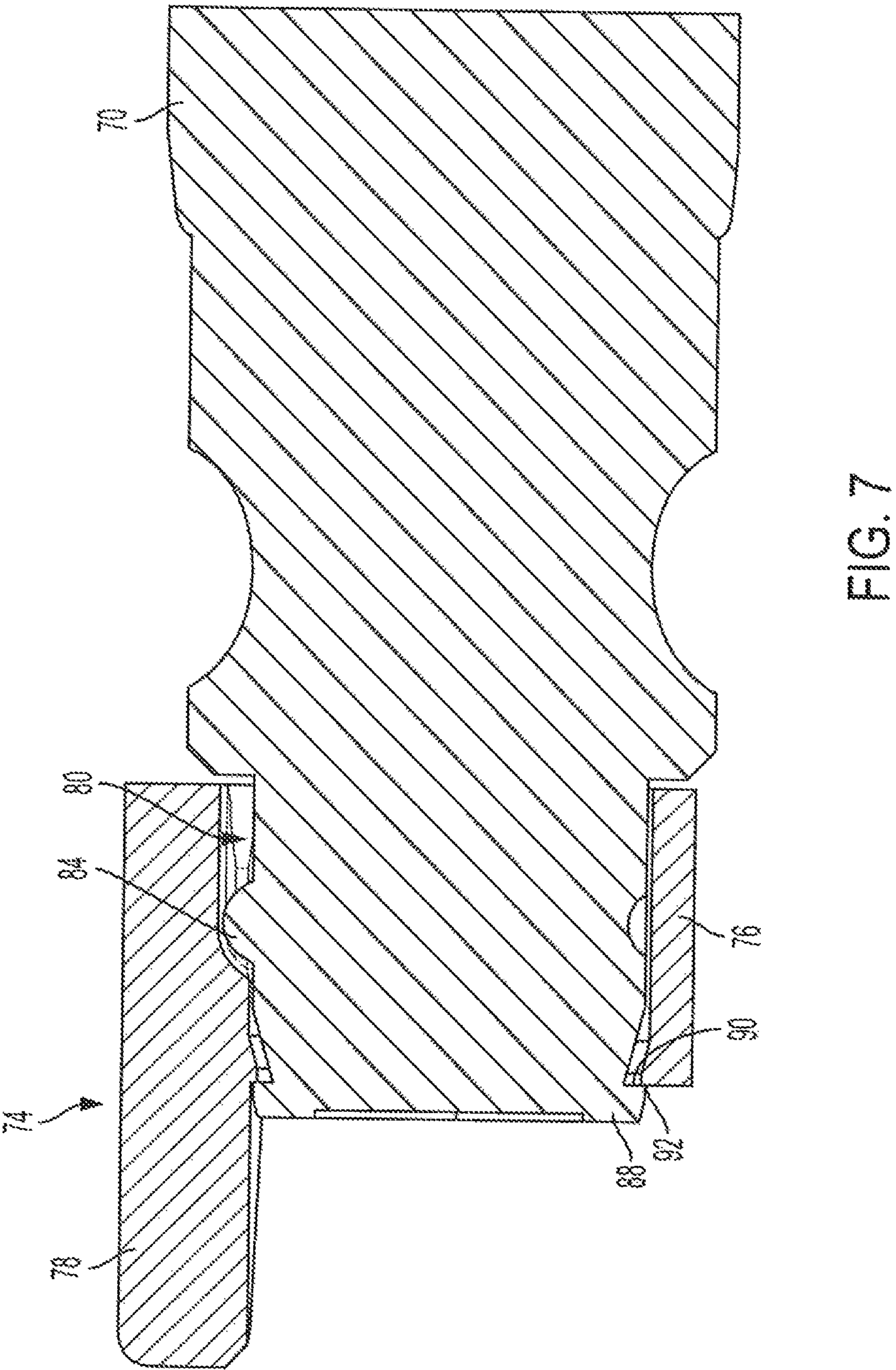
FIG. 7 is a cross-sectional view of the ring flag and the shaft in a third assembly position.
Figure 8:
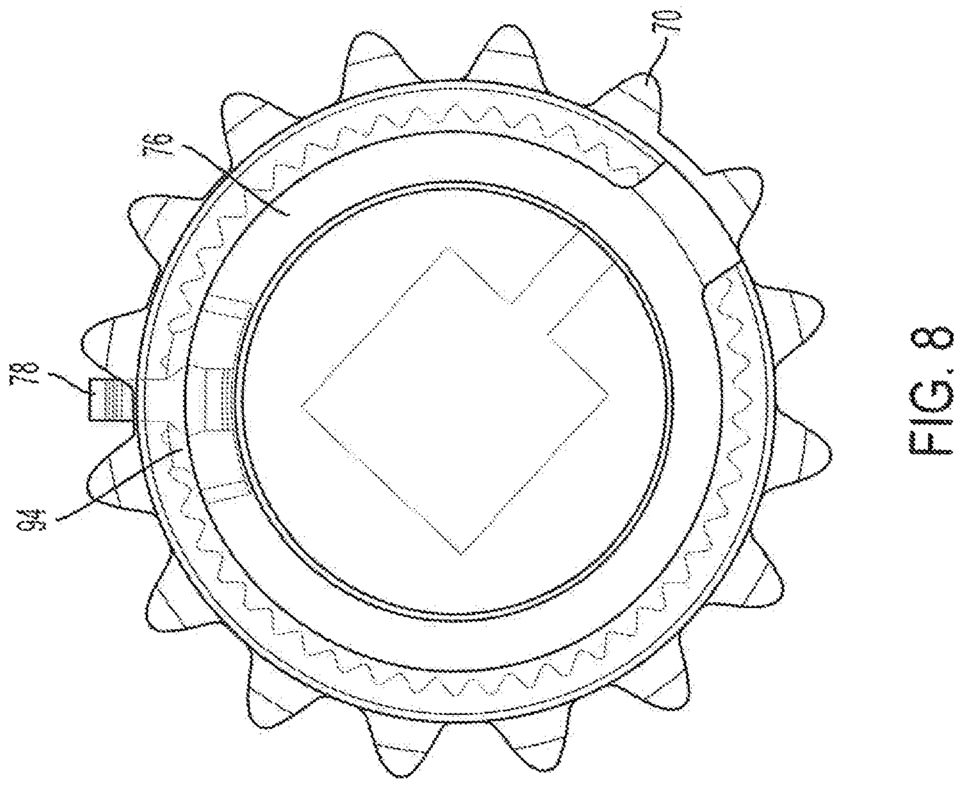
FIG. 8 is an end view of the joint region.
Figures 11A, 11B, 11C:
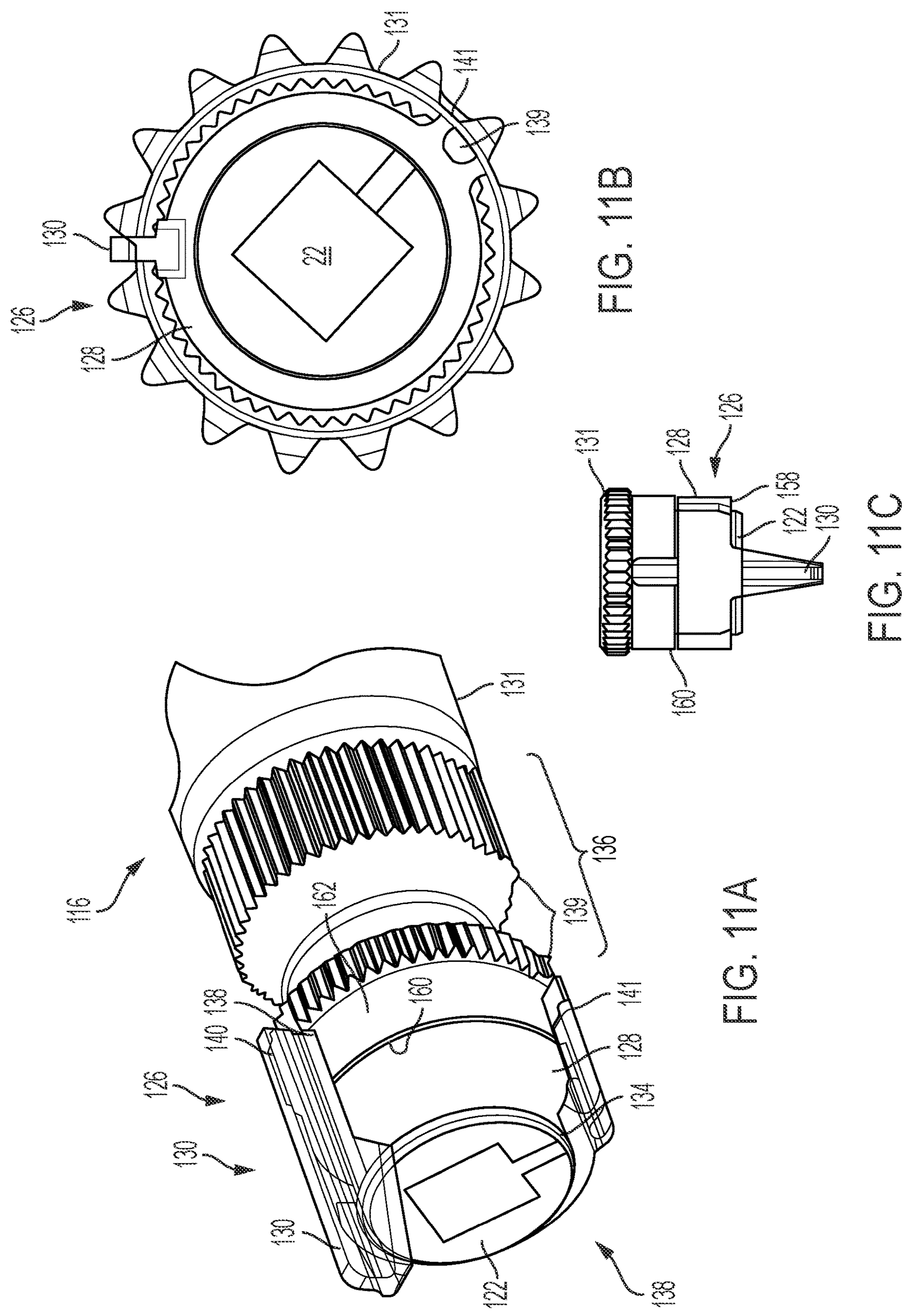
FIG. 11A is a perspective view of a portion of the intermediate shaft illustrating an aspect of the disclosure.
FIG. 11B is an end view of the portion of the intermediate shaft of FIG. 11A.
FIG. 11C is an elevation view of the portion of the intermediate shaft of FIG. 11A.

FIGS. 5-7 illustrate an axial progression of coupling of the intermediate shaft 70 and the ring flag 74 to a desired relative axial position. In particular, as the ring flag 74 advances axially, relative to the intermediate shaft 70, the ring flag 74 is displaced to position an access path (e.g., hole) where a bolt is to be passed through for coupling of the intermediate shaft 70 to the other structural member.

Referring now to FIGS. 10-12B, other embodiments of the disclosure are illustrated. During assembly of the motor vehicle 20, a first end, also referred to as upper end 122, (FIG. 10A) of an intermediate shaft 116 is attached to a clamp yoke 124 that is fixedly attached to a lower end 118 of the steering column assembly 112. It is important to make sure the rotational orientation and axial extent of axial insertion of the intermediate shaft 116 relative to the clamp yoke 124 is proper.

In FIGS. 10A through 10D, a sequence of assembly of the upper end 122 of the intermediate shaft 116 to the clamp yoke 124 is illustrated. To facilitate attaining the proper rotational orientation and axial extent of axial insertion of the intermediate shaft 116 relative to the clamp yoke 124, the intermediate shaft 116 has an indicator member, also referred to as ring flag 126, attached thereto immediately adjacent the upper end 122. The ring flag 126 can both visually and tactilely facilitate assist in making a proper connection of the intermediate shaft 116 to the clamp yoke 124. The ring flag 126 has an annular body, also referred to as annular band 128, sized for attachment about a ring flag seat 129 of a shaft 131 of the intermediate shaft 116, and an indicator flange, also referred to as flag 130, extending axially and radially outwardly from the annular band 128. In accordance with one aspect of the disclosure, the ring flag 126 can readily be assembled to the shaft 131 without need of a special orienting tool.

The intermediate shaft 116 includes the shaft 131 that extends between the first end 122 and an opposite second end. The first end 122 has a first end region including an annular lead-in surface, also referred to as nose 134, having a first diameter D1, a male spline region 136 configured for interdigitated coupling with a female spline region 137 (FIGS. 10A-10D) of the clamp yoke 124, wherein the male spline region 136 has a second diameter D2, and the ring flag seat, also referred to as ring flag region 129 extending between the nose 138 and the male spline region 136. The ring flag region 129 has a third diameter D3. The intermediate shaft 116 can further include a block tooth 139 (FIGS. 11A-12B) extending radially outwardly from the male spline region 136 for receipt in a recessed channel (not shown) of the clamp yoke 124 to facilitate attaining proper rotational orientation of the intermediate shaft 116 with the clamp yoke 124. The intermediate shaft 116 can further include a first ring flag locating feature 138 between the ring flag seat 129 and the male spline region 136. The annular band 128 of the ring flag 126 is disposed on the ring flag region 129 and the flag 130 extends axially beyond the first end 122 and radially outwardly from the annular band 128. The ring flag 126 further includes a second ring flag locating feature 140 extending axially from the annular band 128 in a second direction opposite the first direction of the flag 130. The second ring flag locating feature 140 interacts with the first ring flag locating feature 138 to orient the ring flag 126 in a predetermined rotational orientation relative to the shaft 131, wherein the predetermined rotational orientation assures the intermediate shaft 116 is properly oriented rotationally relative to the clamp yoke 124 during assembly.

The clamp yoke 124 has an annular wall 142 with a through split 144 and a through bore 146 including the female spline region 137. A pair of flanges, also referred to as ears 150, extend radially outwardly from the wall 142 immediately adjacent the through split 144. The ears 150 having through openings 152 configured for receipt of a clamp fastener, such as a threaded bolt (not shown), by way of example and without limitation, therethrough. The clamp fastener is fastened to draw the ears 150 toward one another, thereby bringing the clamp yoke 124 into fixed, clamped relation to the shaft 131, thereby preventing relative movement between the shaft 131 and the clamp yoke 124.

To facilitate assembly of the ring flag 126 to the shaft 131, the annular band 128 is sized for a snap-fit over the nose 134 onto the ring flag seat 129. The annular band 128 is brought into a snapped fit over the nose 134 and about the ring flange region 129 of the shaft 131. To facilitate the snap-fit, the annular band 128 has an annular tapered inner surface 154 (FIGS. 12A and 12B) configured to establish the snap-fit over the nose 134. The tapered inner surface 154 tapers radially inwardly from a generally cylindrical inner surface 156 of the annular band 128 to an end 158 of the ring flag 126. Accordingly, an enlarged diameter portion of the tapered inner surface 154 initially engages the nose 134 during assembly, and then a reduced diameter portion of the tapered inner surface 154 is caused to elastically expand and snap over the nose 134, whereupon the ring flag 126 is captured axially on the ring flag region 129 in its assembled position by the slightly enlarged diameter D1 nose 134 and a radially outwardly extending shoulder 160 extending to a cylindrical portion 162 having a diameter D4. The cylindrical portion 162 extends to the male spline region 137 having the diameter D2, wherein diameter D2 is greater than diameter D4. Accordingly, the diameter D3 of the ring flag region 142 is less than D1, D2, and D3. Further, the ring flag 126 is captured rotationally on the shaft 131 via the second ring flag locating feature 140 being operably coupled with the first ring flag locating feature 138. The ring flag 126 further includes a ring flag block tooth 141 arranged for axial alignment with the block tooth 139 of the shaft 131.

In the illustrated embodiment, the first ring flag locating feature 138 is coaxially aligned with the second ring flag locating feature 140. The second ring flag locating feature 140 is formed as a protrusion extending axially from the annular band 128 and the first ring flag locating feature 140 is formed in the shaft 131 as a recessed channel, also referred to as notch, extending into the cylindrical portion 162, wherein the recessed channel 138 can be readily formed in a forming process, thereby avoiding the increased cost associated with machining. The protrusion 140 has a radially innermost surface 164 configured for radial clearance with the nose 134.

Figure 12A:
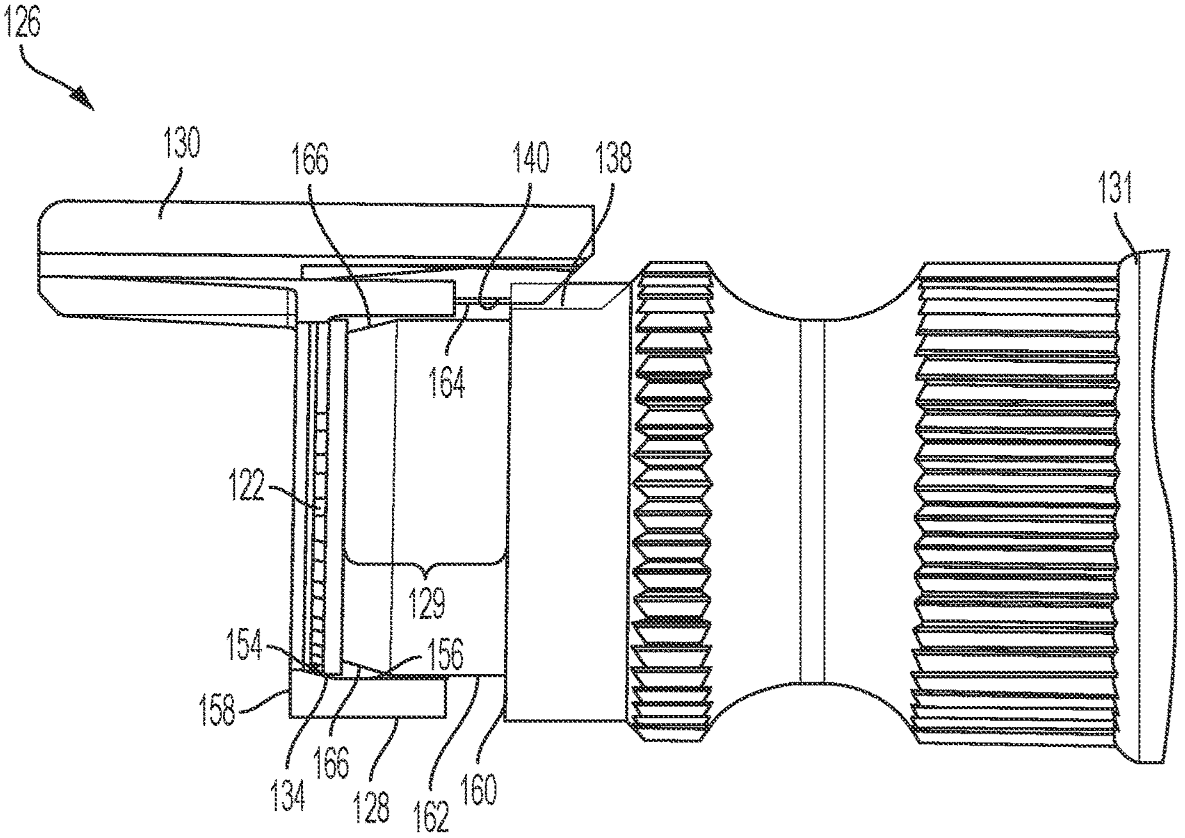
FIGS. 12A-12B illustrates a series of assembly positions during an assembly process of the disclosed assembly.
Figure 12B:
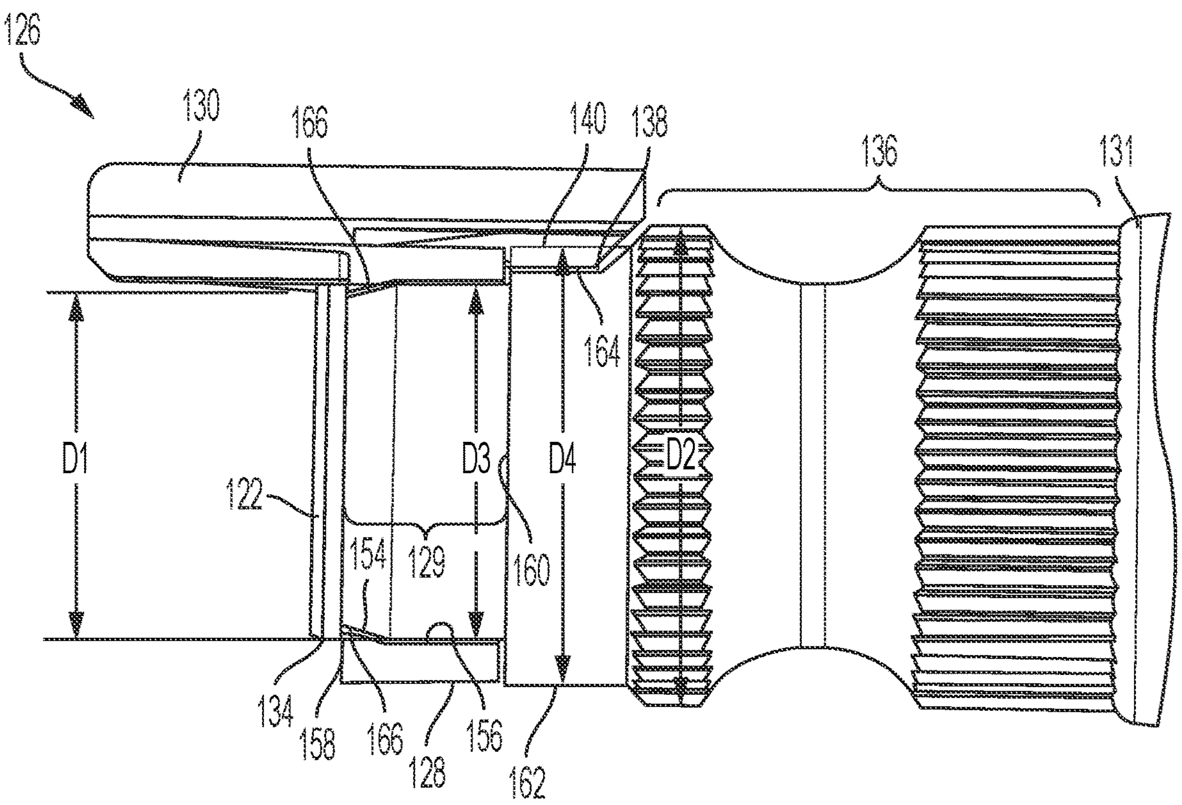

To further facilitate assembly, as shown in FIG. 12A, the protrusion 140 extends into the recessed channel 138 prior to the annular band 128 being snap-fit over the nose 134. Upon the tapered inner surface 154 initially engaging the nose 134, the cylindrical inner surface 156 is disposed in part over the cylindrical portion 162, while the protrusion 140 is received in part in the channel 138, thereby orienting and stabilizing the ring flag 126 while being subsequently snap-fit over the nose 134 onto the ring flag seat 129. Then, upon pressing the ring flag 126 onto the ring flag seat 129, the annular tapered inner surface 156 is snapped over the nose 134 and brought into seated engagement with a mating annular tapered region 166 of the ring flag seat 129.

Upon completing assembly of the ring flag 126 to the shaft 131, the intermediate shaft assembly 116 is ready for attachment to the clamp yoke 124 to form the intermediate shaft and clamp yoke assembly that operably connects the steering column assembly 112 to the steering gear assembly 114.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering shaft assembly comprising:

a shaft having a first end region including a nose, a male spline region coupleable with a female spline region of a clamp yoke, a ring flag seat adjacent said nose, and a first ring flag locating feature between said ring flag seat and said male spline region, and a retention shoulder submerged below the ring flag installation area diameter and a groove; and a ring flag having an annular band seated on said ring flag seat, a flag extending axially from said annular band in a first direction beyond said first end region and radially outwardly from said annular band, and a second ring flag locating feature extending axially from said annular band in a second direction opposite said first direction, said second ring flag locating feature interacting with said first ring flag locating feature to orient said ring flag in a predetermined rotational orientation relative to said shaft, wherein said first ring flag locating feature is coaxially aligned with said second ring flag locating feature, wherein said second ring flag locating feature is a protrusion and said first ring flag locating feature is a recessed channel, wherein said annular band is sized for a snap-fit over said nose into said ring flag seat, wherein said protrusion extends into said recessed channel prior to said annular band being snap-fit over said nose, wherein a retention lip is present on the inner diameter of said annular band, which snaps into the groove, wherein the lead-in diameter of the shaft is substantially equal to the inner diameter of said annular band, wherein the cross-section of ring flag extension that protrudes off the end of the shaft is reduced by moving said first ring flag locating feature and said second ring flag locating feature, so gussets along the ring diameter are present for strength.

2. The steering shaft assembly of claim 1, wherein said wherein said recessed channel is formed in a forming process.

3. The steering shaft assembly of claim 1, wherein said annular band has an annular tapered inner surface configured to establish the snap-fit over said nose.

4. The steering shaft assembly of claim 1, wherein said protrusion has a radially innermost surface configured for radial clearance with said nose.

5. A steering shaft and clamp yoke assembly comprising:

a clamp yoke having an annular wall with a through split and a through bore having a female spline region, said annular wall having through openings configured for receipt of a clamp fastener therethrough;

a shaft having a first end region including a nose having a lead-in diameter, a male spline region coupleable with said female spline region of said clamp yoke, a ring flag seat adjacent said nose, and a first ring flag locating feature between said ring flag seat and said male spline region, and a retention shoulder submerged below the ring flag installation area diameter and a groove; and a ring flag having an annular band seated on said ring flag seat, a flag extending axially from said annular band in a first direction beyond said first end region and radially outwardly from said annular band, and a second ring flag locating feature extending axially from said annular band in a second direction opposite said first direction, said second ring flag locating feature interacting with said first ring flag locating feature to orient said ring flag in a predetermined rotational orientation relative to said shaft, wherein said first ring flag locating feature is coaxially aligned with said second ring flag locating feature, wherein said second ring flag locating feature is a protrusion and said first ring flag locating feature is a recessed channel, wherein said annular band is sized for a snap-fit over said nose into said ring flag seat, wherein said protrusion extends into said recessed channel prior to said annular band being snap-fit over said nose, wherein a retention lip is present on the inner diameter of said annular band, which snaps into the groove, wherein the lead-in diameter of the shaft is substantially equal to the inner diameter of said annular band, wherein the cross-section of ring flag extension that protrudes off the end of the shaft is reduced by moving said first ring flag locating feature and said second ring flag locating feature, so gussets along the ring diameter are present for strength.

6. The steering shaft and clamp yoke assembly of claim 5, wherein said wherein said recessed channel is formed in a forming process.

7. The steering shaft and clamp yoke assembly of claim 5, wherein said annular band has an annular tapered inner surface configured to establish the snap-fit over said nose.

8. The steering shaft and clamp yoke assembly of claim 5, wherein said protrusion has a radially innermost surface configured for radial clearance with said nose.

* * * * *